United States Patent [19]

Peddinghaus et al.

[11] 4,102,228
[45] Jul. 25, 1978

[54] CUTTING APPARATUS

[75] Inventors: Carl Ullrich Peddinghaus, Obere Lichtenplatzer Str. 276, Wuppertal-Barmen; Wolfgang Hellkotter, Dortmund; Albert Einhaus, Hagen; Karl Robert Buschmann, Gevelsberg, all of Fed. Rep. of Germany

[73] Assignee: Carl Ullrich Peddinghaus, Fed. Rep. of Germany

[21] Appl. No.: 766,199

[22] Filed: Feb. 7, 1977

[30] Foreign Application Priority Data

Feb. 7, 1976 [DE] Fed. Rep. of Germany ....... 2604823

[51] Int. Cl.² .............................................. B26D 7/06
[52] U.S. Cl. ....................................... 83/156; 83/210; 83/155; 83/467 R
[58] Field of Search ................. 83/318, 320, 467, 155, 83/155.1, 210, 212, 156, 209

[56] References Cited

U.S. PATENT DOCUMENTS

| 2,793,662 | 5/1957 | Oholm | 83/467 A X |
| 3,370,494 | 2/1968 | Schenck | 83/155 |
| 4,007,655 | 2/1977 | Schuetz et al. | 83/155 |

*Primary Examiner*—Willie G. Abercrombie
*Attorney, Agent, or Firm*—Holman & Stern

[57] ABSTRACT

A cutting apparatus for cutting steel rod into predetermined lengths. The apparatus has a feed track and a discharge track at opposite sides of a shearing unit, the discharge track having a number of stops which may be located at selected spacings. The shear unit is adjustable between the tracks whereby an adjustable intermediate track is located between the shear unit and the entry to the discharge track according to the position of the shears.

8 Claims, 3 Drawing Figures

CUTTING APPARATUS

BACKGROUND OF INVENTION

This invention relates to cutting apparatus for cutting steel rod off to predetermined length and conveying it to a desired location. The invention is particularly applicable to the cutting of steel rod of the kind used for concrete reinforcement.

A cutting installation of this type is described in U.S. Pat. No. 3370494. Feed and discharge tracks are provided in the form of rollways with lay-by or collector aprons at the sides. The head section of the discharge track tilts downwards and is fitted with a clamp which will retain the cut end sections, so that after completion of the cut the shears cannot lift the end sections as a result of the sudden relief. In order to adjust a cut length between two stops, the discharge track is moved relatively to the shears, so that the dimensional setting determined by the length between two stops can be achieved. This pre-supposes moving connections to hydraulic cylinders or the like, necessary to the displacement stroke of the discharge track. In order to exclude reliably a displacement due to impact of the rod, the discharge track also has a suitable safety means against this. On transferring the cut sections on the discharge track by transverse movement towards a collector located alongside the discharge track, the cut sections are not adjusted against a stop at a particular point on the collector apron, but are left in the original position achieved by longitudinal displacement of the discharge track for the purpose of fine adjustment before cutting. The alignment involves considerable movement. The cut lengths are limited at the bottom during cutting, since they have to be grasped at least by the head of the discharge track. The cut sections falling in the variable range between the head of the discharge track and the shears have no transport track, unless some auxiliary means are located previously in the discharge track or at the head.

Starting from this particular stage of technology, an object of the invention is to provide a cutting apparatus allowing the previously outlined difficulties to be alleviated of avoided. For a modest expense it should be possible to produce cut rod of accurately held dimension, allowing transfer in good alignment onto collector aprons, even in the case of very short lengths.

BRIEF SUMMARY OF THE INVENTION

According to the invention, the shears are mounted so that they are adjustable between the feed track and the discharge track, and so that a suitable intermediate adjustable track section may be located between the shears and the beginning of the discharge track to suit the position of the shears.

Such a cutting apparatus can be operated to give high yields. Where for instance a particular length is cut, this can be forwarded along the discharge track preferably in the form of a roller conveyor after lowering the stop and on towards a further stop located at a later stage in the conveyor travel, so that the shears may then proceed with the next cut. The previously forwarded section remains against the stop in the subsequent location of the conveyor and can then be accurately arranged and transferred to a collector apron alongside the discharge track. The collector aprons can be located on either side of the discharge track for differing lengths or differing steel grades and can be loaded as already described without interrupting the shearing operation. The absence of moving ducts allows a fixed and consequently break-down-free installation of the discharge track. This also has a favourable effect on the accuracy of the cut lengths, since the discharge track does not yield after the cut lengths come to bear against a stop located in the conveyor stretch.

More particularly it is possible to process cut lengths which are only slightly greater or even smaller than the distance between the shears and the discharge track. These lengths are collected by the intermediate track section after cutting and can be transferred from this to the discharge track. This can be achieved by the conveyor equipment fitted to the intermediate track section or equally by the rods being pushed at the rear end by the section from which it has been removed, the rod being pushed along until it is taken up by the conveyor on the discharge track, preferably running faster than the means used for the subsequent rod. When the cut section has taken over, the stop for the next cut length can be brought into the conveyor stretch, the following rod then being stopped to allow the next cut. Naturally a stop is located at the beginning of the discharge track in this arrangement, so that a reliable dimension can be maintained even with short lengths.

A further adjustable length intermediate track section is preferably located between the shears and the feed track. This ensures that very short rods remain supported right up to their introduction into the shears and can then be discharged accordingly.

A suitable length of intermediate track section for each shear position is reliably achieved by ensuring that the components determining the length of the intermediate track sections remain connected with the shears by means of a restraint.

Although the procedure as described also allows very short lengths to be moved along an intermediate track without conveyor means, the design of the intermediate track with a drive in the conveyor direction is advantageous; this not only saves considerable time in the removal of short lengths, but also allows effective transport of longer sections throughout the whole of the area located after the shears.

The distances for the stops located on the discharge track require the possibility of adjustment to an intermediate dimension by displacement of the shears. In this particular case the stops for the discharge track can be arranged at closer intervals in the first section of the conveyor than in a subsequent section. The number of stops should be limited to an economically effective extent.

The intermediate track sections, as well as the discharge track, should also preferably be roller tracks. However, in this case the rollers are arranged longitudinally in the direction of the conveyor so that they can be displaced. In particular the rollers can be arranged as the central or scissors joints between the respective links of multi-link telescopic pantograph-type linkages connected between the feed track and the shear and the shear and the discharge track respectively. This arrangement has the advantage that the rollers move automatically to narrower or wider distances, in accordance with the extent of the distance between the shear and the end or the beginning of the track.

The drive for intermediate track sections of pantograph form with rollers at the scissors joints is conveniently, by way of drive chains, connected from roller to roller. This drive method has the advantage that the members transmitting the drive, namely the chains, are tensioned in each shear position, so that all the rolls rotate together at the same speed.

The cut lengths are easily transported in collector aprons located alongside the discharge track in a known manner, when several supporting stops are raised together, the said stops being tapered on one side transversely to the longitudinal direction of the rods. In this manner, the sections are supported at an angle from which they can slide onto the adjacent collector apron.

BRIEF SUMMARY OF THE DRAWINGS

The invention will now be described, by way of example, with reference to the accompanying drawings in which.

DETAILED DESCRIPTION OF THE INVENTION

Figure 1:
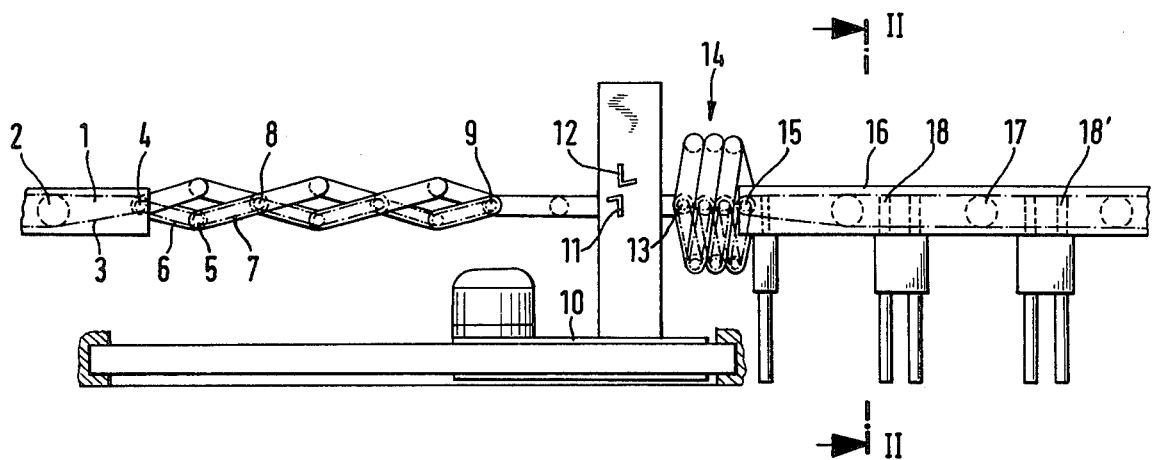
FIG. 1 is a side view of the cutting apparatus of the invention.
Figure 3:
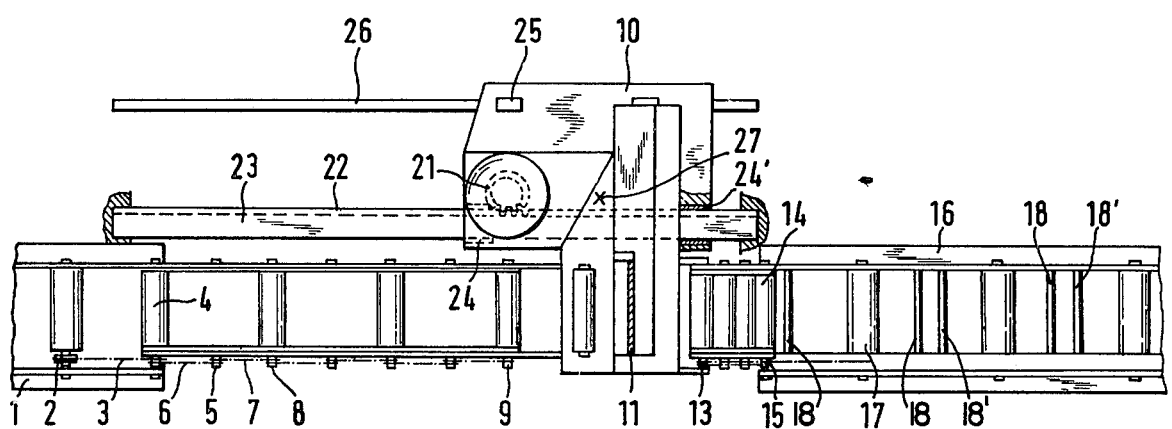
FIG. 3 is a plan view of the cutting apparatus of FIG. 1.

The outout end of a feed track 1 is shown on the left of FIG. 1. It is fitted with a pulley 2 of a drive unit, which by means of chain 3 drives the shaft 4 of the end joint of a multilink telescopic pantograph-type linkage forming an intermediate track section connecting the feed track to a movable shear unit on a shear carriage 10. Drive chains 6, 7 run alternately from the chain wheels not shown for the corner joints 5 of the linkage to the chain wheels of the central or scissors joints 8 of the linkage, which central joints carry conveying rollers as shown in FIG. 3. The right hand end of the linkage is secured from to the shear carriage 10.

The shear carriage 10 is designed in the usual manner with shear beams 11 and 12. The end joint 13 of a further pantograph-type linkage 14 forming another intermediate track section is linked to the right hand side of the shear carriage 10, the other end joint 15 of the linkage 14 being secured to the end of the discharge track 16 and also being driven from a drive located at that point, drive chains being provided as shown in the left hand part of FIG. 1. In the drawing, the shear carriage 10 is shown in the extreme position on the right, so that the roller track rolls of the intermediate track section 14 may follow at the shortest interval, whereas the roller track section rolls of the intermediate track on the feed side are at their maximum interval.

The discharge track 16 is provided with roller track rolls 17 as well as raisable and lowerable stops 18.

Figure 2:
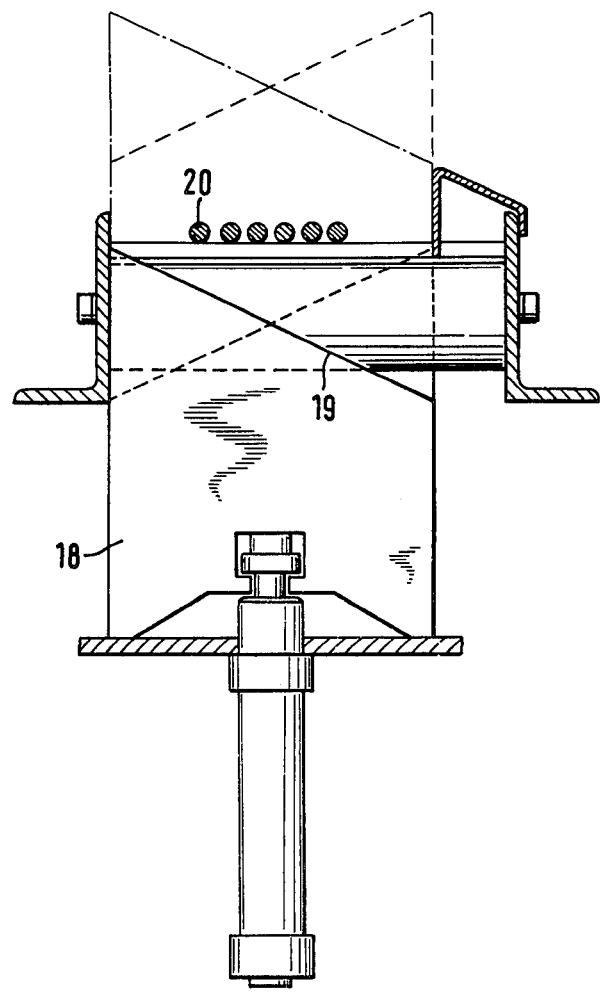
FIG. 2 is a section along II/II of FIG. 1.

As shown in FIG. 2, the stops 18 consist of side-guided plates with one sloping edge 19. The position of the stop 18 in the lowered position, drawn in bold lines, whereas the position of the raised stop 18 is shown in broken lines. The stops can be selectively raised on the one hand for the purpose of dimensional adjustment of a rod being cut by location of its leading end and on the other hand to ensure the transfer of cut rods 20 on the conveyor stretch to a collector apron alongside the discharge track and not shown in greater detail. In order to provide transfer to collector aprons located on the right and on the left of the discharge track additional stops 18' are located in close sequence to certain of the stops 18, and the stops 18, 18' are tapered towards opposite sides of the track. When it is desired to transfer a cut rod to a collector apron on one side of the discharge track, the rod is advanced over a stop which is tapered toward that side and the stop is then raised to transfer the rod.

FIG. 3 shows a definition of the components bearing the same references, in accordance with FIG. 1. This drawing also shows the drive pinion 21 of the shear carriage 10 meshing with a rack 22 running parallel to a longitudinal guide 23 on which the shear carriage 10 slides with guide bushes 24 and 24'. The shear carriage 10 is also fitted with a roller 25 rotating along a rail 26. In this manner the shear carriage 10 with its centre of gravity between the guide bushes and the rollers behind the drive pinion 21 and located approximately at point x, is effectively supported during its movement.

We claim:

1. Cutting apparatus for steel rod comprising a feed track for conveying rods to be cut, said feed track having an output end, a discharge track aligned with said feed track and for receiving rods from the feed track, said discharge track having an input end spaced from said output end of said feed track, a series of selectively raisable and lowerable stops associated with said discharge track for positioning the leading end of a rod to be cut by raising of a selected one of said stops, a movable shear unit located between said output end of said feed track and said input end of said discharge track, means for adjusting the position of said shear unit relative to said output and input ends respectively to alter the position of operation of said unit and an intermediate track section between the shear unit and the input end of the discharge track said intermediate section being adjustable in length to accommodate changes in position of the shear unit.

2. Cutting apparatus according to claim 1, including further intermediate track section of adjustable length between the end of the feed track and the shear unit.

3. Cutting apparatus according to claim 2 wherein the intermediate track sections include driven conveying means.

4. Cutting apparatus according to claim 2 wherein the intermediate track sections comprise roller tracks.

5. Cutting apparatus according to claim 4, wherein the roller tracks each comprise a multi-link telescopic pantograph-type linkage with conveying rollers at the scissors joints of each pair of links and wherein said track sections are connected between the feed track and the shear unit and between the shear unit and the discharge track respectively.

6. Cutting apparatus according to claim 5 including drive means for the conveying rollers.

7. Cutting apparatus according to claim 6, wherein said drive means comprises a chain drive means including chains connected from conveying roller to conveying roller.

8. Cutting apparatus according to claim 7 wherein the feed track and the discharge track include chain drives connected with the respective chain drive means of the intermediate track sections.

* * * * *